(12) United States Patent
Brown et al.

(10) Patent No.: US 7,458,801 B1
(45) Date of Patent: Dec. 2, 2008

(54) REMOVAL FROM CORE MOLD PART OF TUBULAR INJECTION MOLDED PLASTIC PRODUCT FORMED WITH TWO OPEN ENDS

(75) Inventors: Paul Philip Brown, Ramona, CA (US); Jens Ole Sorensen, Rancho Santa Fe, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 182 days.

(21) Appl. No.: 11/657,148

(22) Filed: Jan. 24, 2007

Related U.S. Application Data

(62) Division of application No. 10/813,970, filed on Mar. 31, 2004, now Pat. No. 7,169,342.

(51) Int. Cl.
*B29C 65/00* (2006.01)

(52) U.S. Cl. ............... 425/517; 425/404; 425/437; 425/445

(58) Field of Classification Search .......... 425/437, 425/445, 517, 404, 813; 53/331.5, 330
See application file for complete search history.

(56) References Cited

U.S. PATENT DOCUMENTS

| | | | | |
|---|---|---|---|---|
| 2,884,751 A | * | 5/1959 | Bjering | .................. 53/317 |
| 2,958,898 A | * | 11/1960 | Voumard et al. | ............ 264/322 |
| 3,305,892 A | | 2/1967 | Heider | |
| 3,737,272 A | | 6/1973 | Segmuller | |
| 3,767,156 A | | 10/1973 | Sullivan et al. | |
| 3,996,329 A | | 12/1976 | Holland et al. | |
| 4,128,381 A | | 12/1978 | Bonis | |
| 4,340,352 A | * | 7/1982 | Hayberg | ................. 425/517 |
| 4,351,630 A | * | 9/1982 | Hayberg et al. | ............ 425/517 |
| 4,587,075 A | | 5/1986 | Butcher et al. | |
| 4,602,728 A | | 7/1986 | Ha | |
| 4,632,657 A | | 12/1986 | Potoczky | |
| 4,633,646 A | * | 1/1987 | Ellis et al. | .................. 53/331.5 |
| 4,733,801 A | | 3/1988 | Scammell | |
| 4,743,420 A | | 5/1988 | Dutt | |
| 4,796,766 A | | 1/1989 | Clark | |
| 4,867,672 A | | 9/1989 | Sorensen | |
| 4,959,005 A | | 9/1990 | Sorensen | |
| 4,960,557 A | | 10/1990 | Sorensen | |
| 4,986,862 A | | 1/1991 | Matsufuru | |
| 5,049,344 A | | 9/1991 | Sorensen | |
| 5,174,941 A | | 12/1992 | Sorensen | |
| 5,207,048 A | * | 5/1993 | Wysocki | ................ 53/133.2 |

(Continued)

*Primary Examiner*—Yogendra Gupta
*Assistant Examiner*—Emmanuel S Luk
(74) *Attorney, Agent, or Firm*—Edward W. Callan

(57) ABSTRACT

A hollow plastic product with a substantially tubular section, two open ends and a thread at the outside of one end of the product is removed from a core mold part by closing the threaded end of the molded product and injecting compressed air into the molded product to loosen the molded product from the core mold part. The threaded end of the product is closed by attaching a threaded closure having a matching thread onto the threaded end of the molded product. A robotic arm is used to robotically attach the threaded closure onto the threaded end of the product. The threaded closure is a plastic cap that injection molded in the injection molding system in which the product is injection molded, with the caps being injection molded at the same average rate as the products are injection molded.

7 Claims, 8 Drawing Sheets

U.S. PATENT DOCUMENTS

| | | |
|---|---|---|
| 5,262,112 A | 11/1993 | Sorensen |
| 5,342,301 A | 8/1994 | Saab |
| 5,346,659 A | 9/1994 | Buhler et al. |
| 5,490,966 A | 2/1996 | Peterson et al. |
| 5,661,889 A | 9/1997 | Valyi |
| 5,705,112 A * | 1/1998 | Gram .......................... 264/242 |
| 5,954,233 A * | 9/1999 | Kawashima et al. .......... 222/83 |
| 6,062,408 A | 5/2000 | Beck et al. |
| 6,205,743 B1 * | 3/2001 | Castellari ....................... 53/53 |
| 6,210,624 B1 | 4/2001 | Mayer |
| 6,237,791 B1 | 5/2001 | Beck et al. |
| 6,240,678 B1 * | 6/2001 | Spether ....................... 53/317 |
| 6,475,415 B1 | 11/2002 | Neter et al. |
| 6,736,628 B1 | 5/2004 | Zuffa |
| 6,915,823 B2 | 7/2005 | Osborne et al. |
| 7,293,396 B1 * | 11/2007 | Cunningham ................ 53/490 |
| 2003/0132551 A1 | 7/2003 | Brown et al. |
| 2006/0231519 A1 * | 10/2006 | Py et al. ..................... 215/342 |
| 2006/0272284 A1 * | 12/2006 | Galimberti et al. ............. 53/75 |

\* cited by examiner

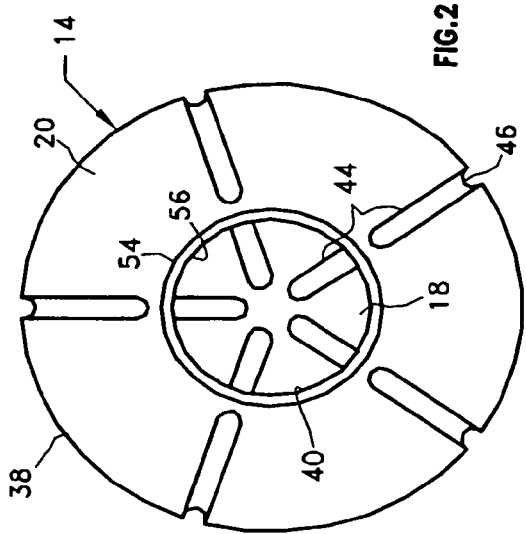
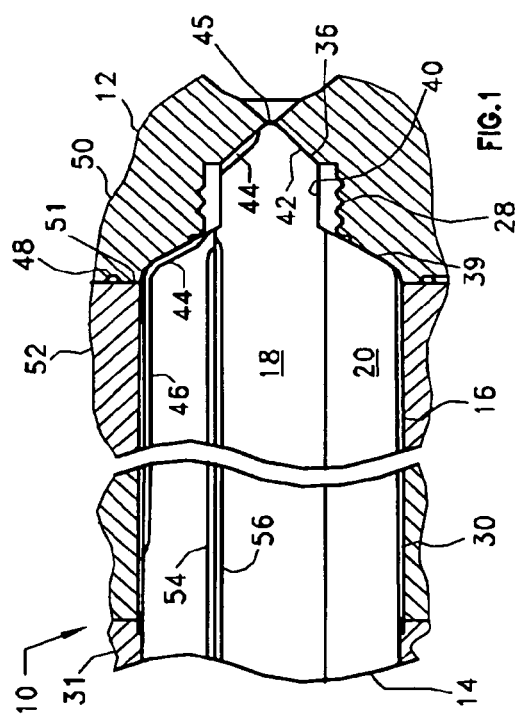
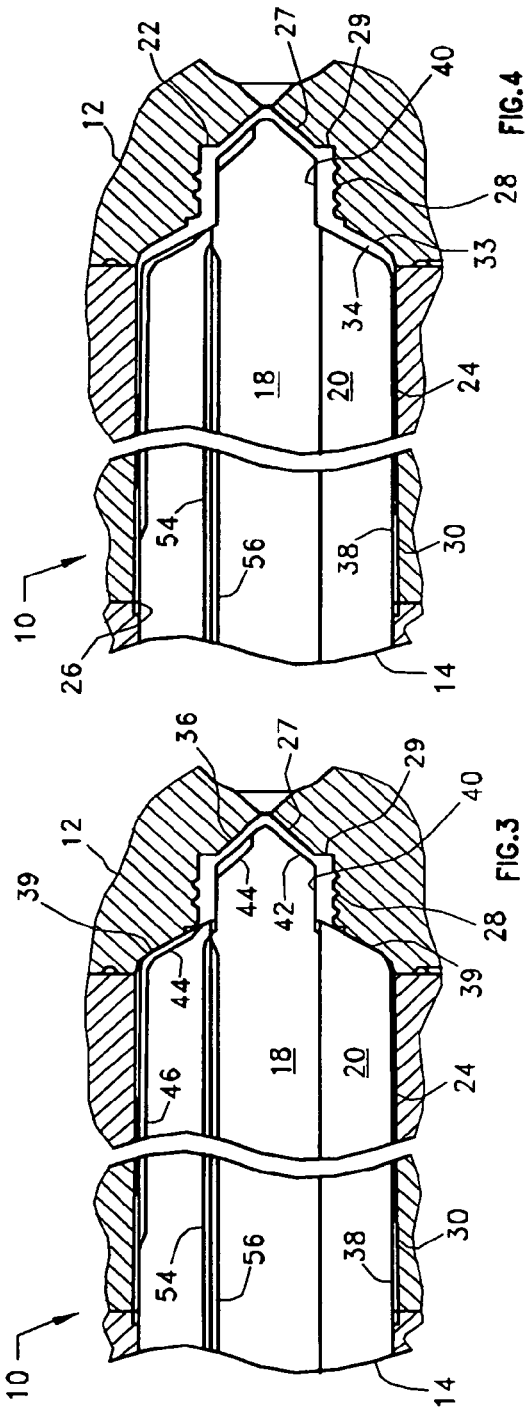
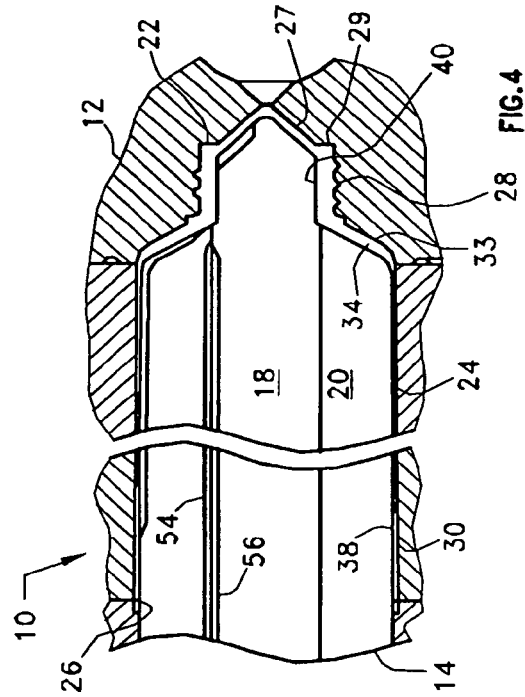

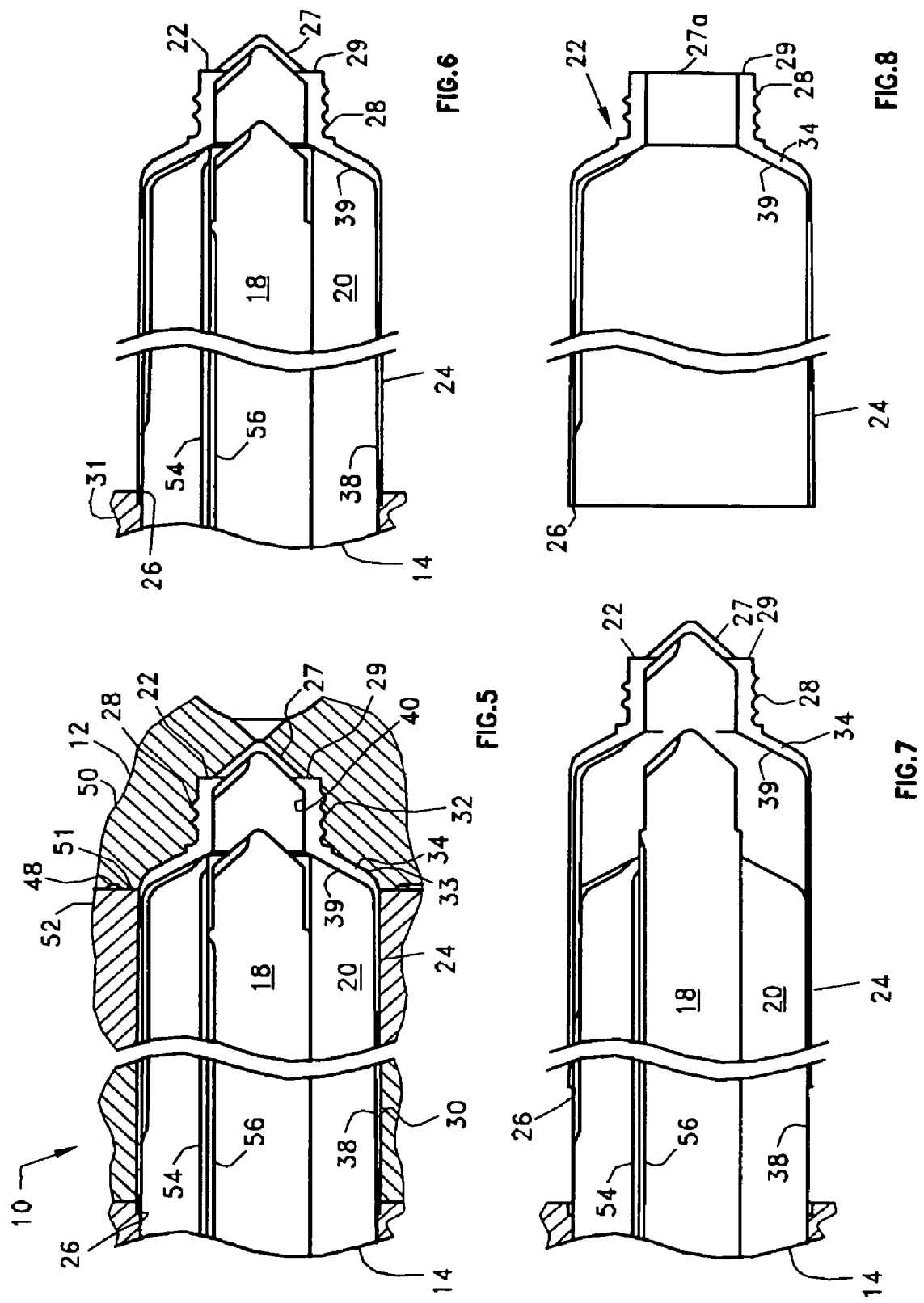

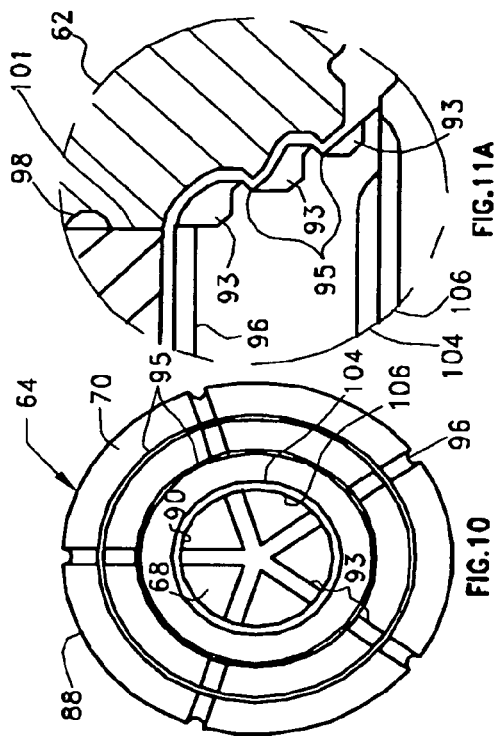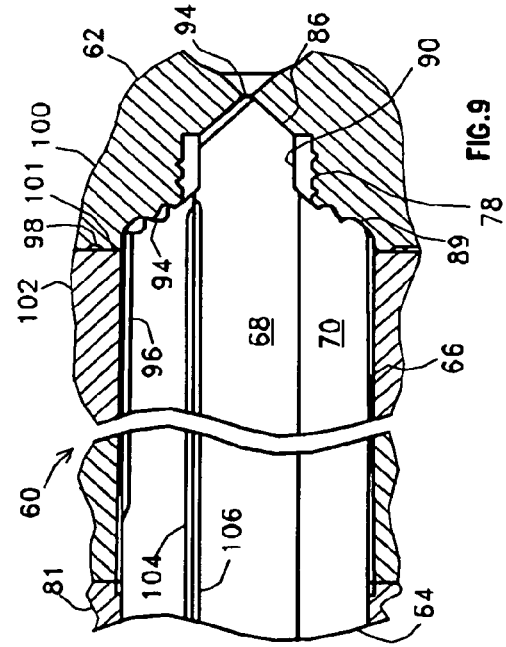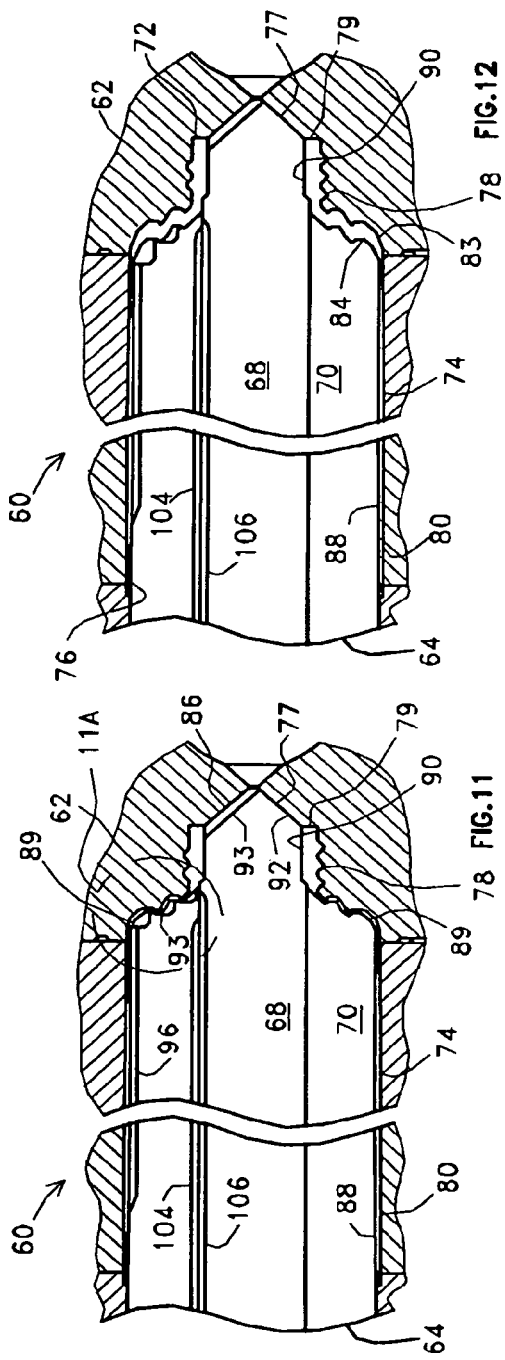

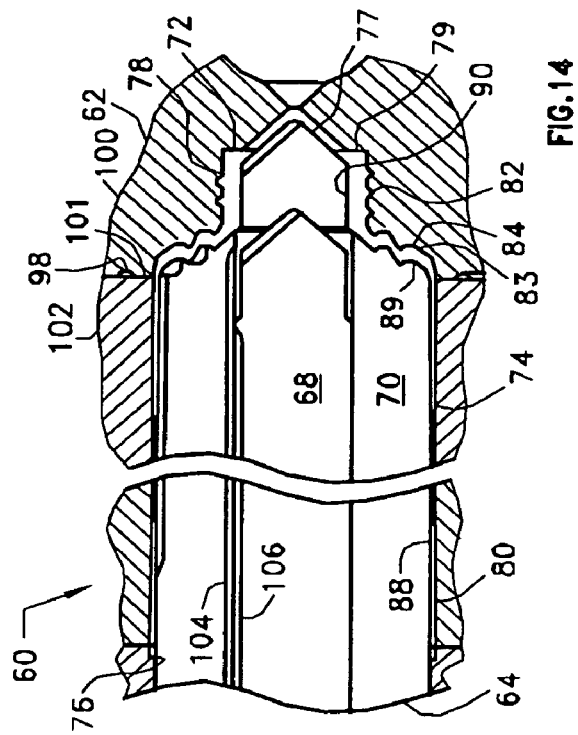
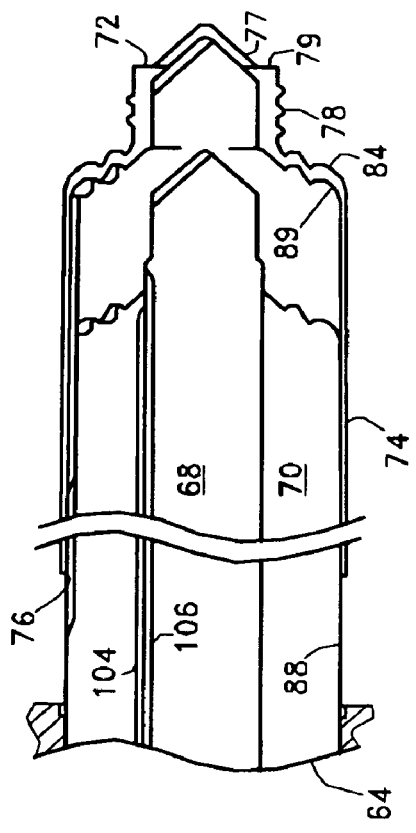
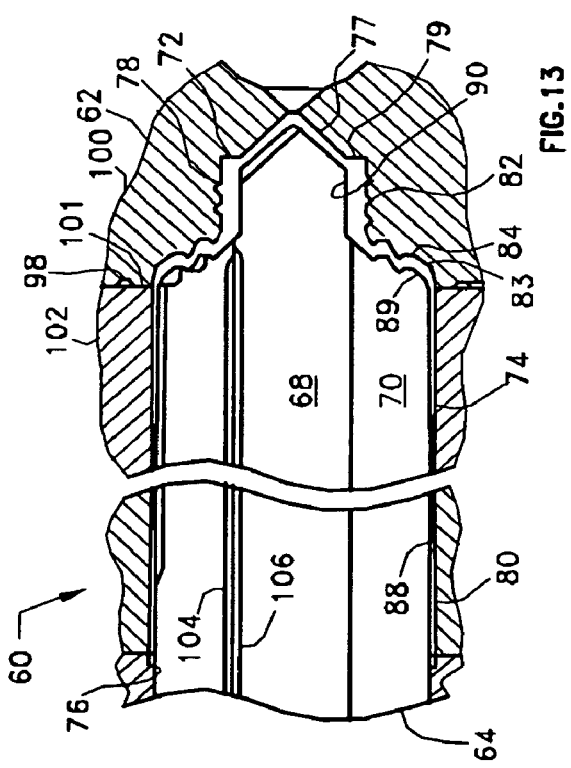
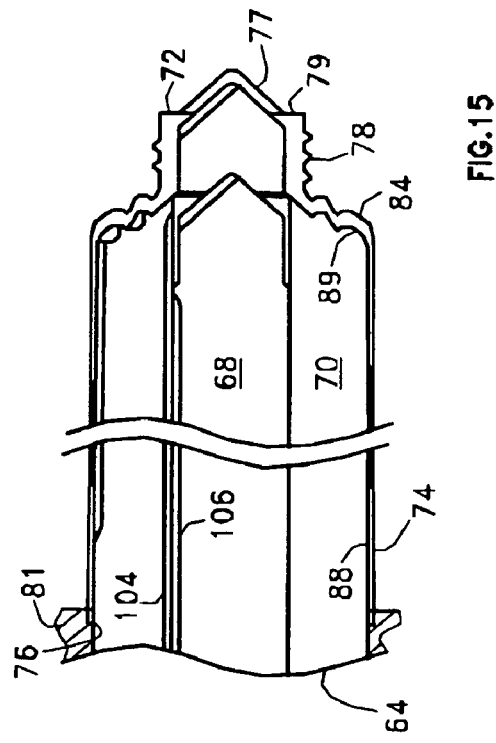

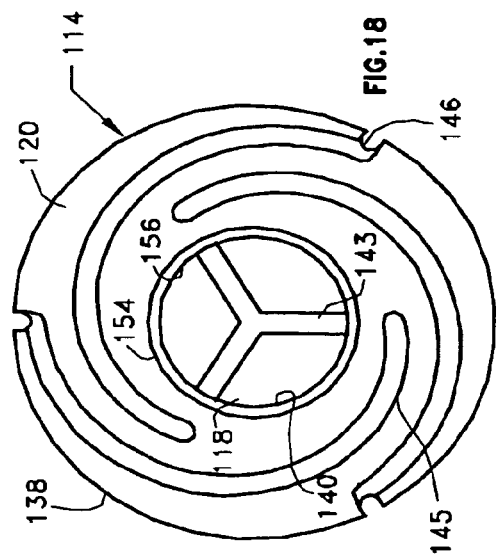
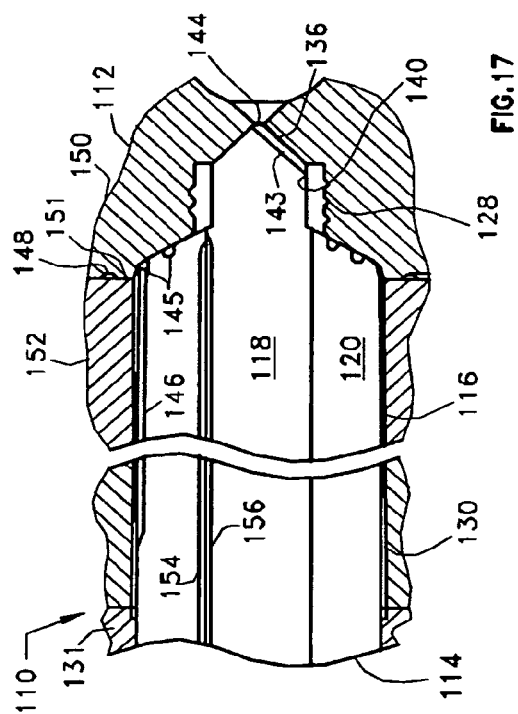
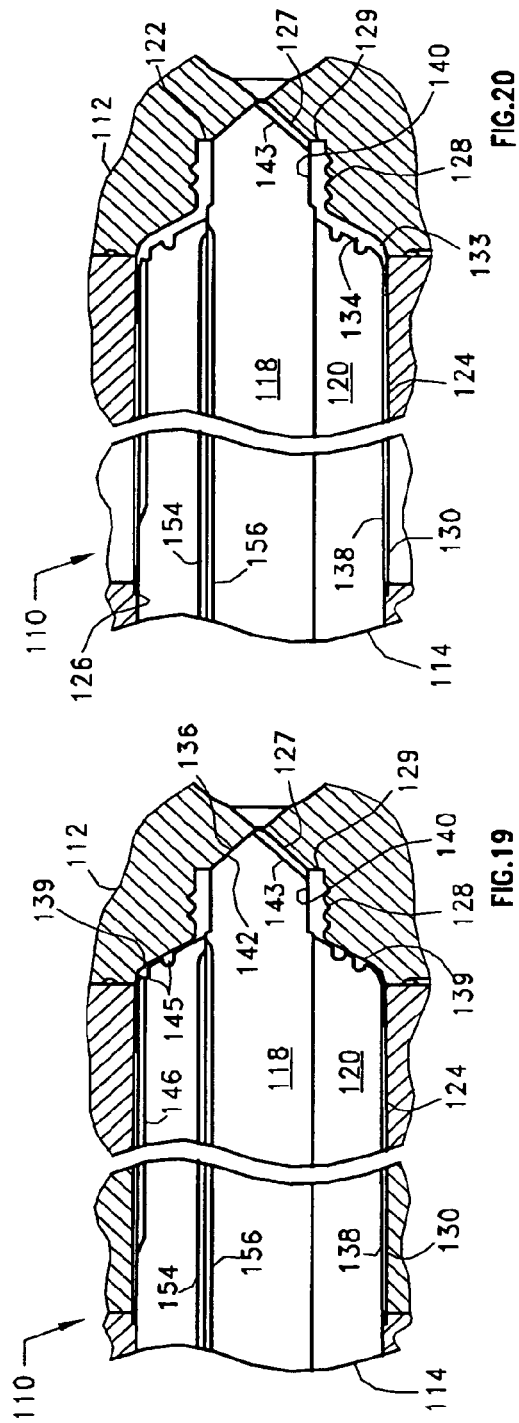

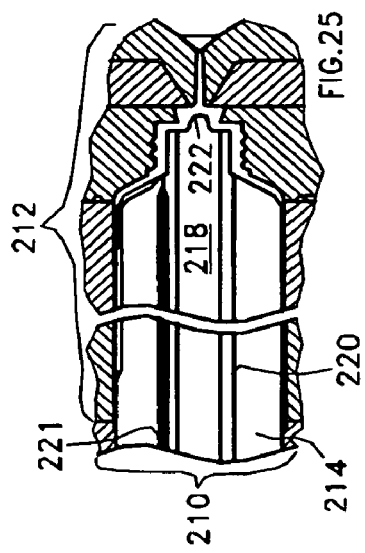
FIG.25
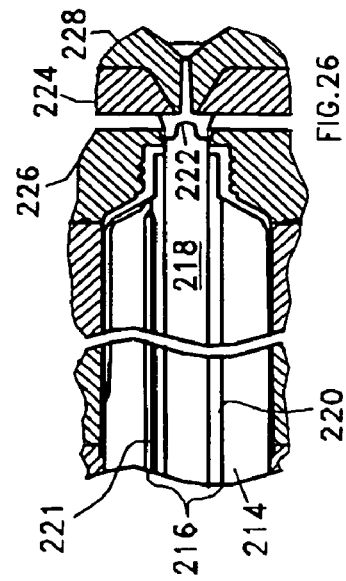
FIG.26
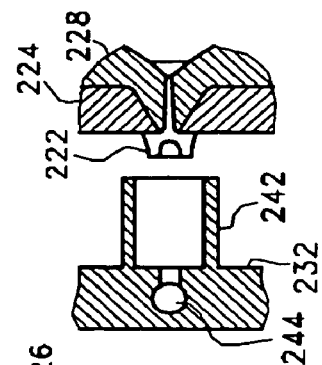
FIG.27
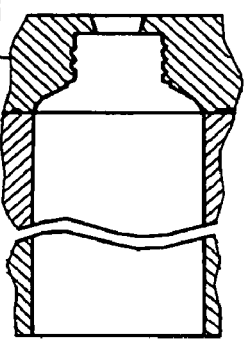
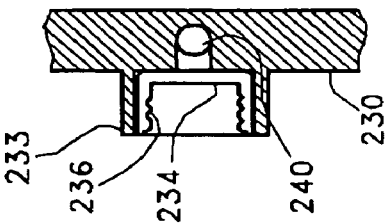
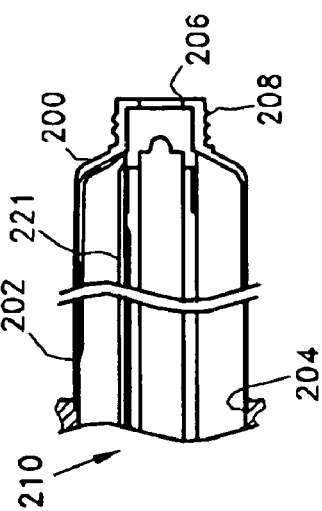

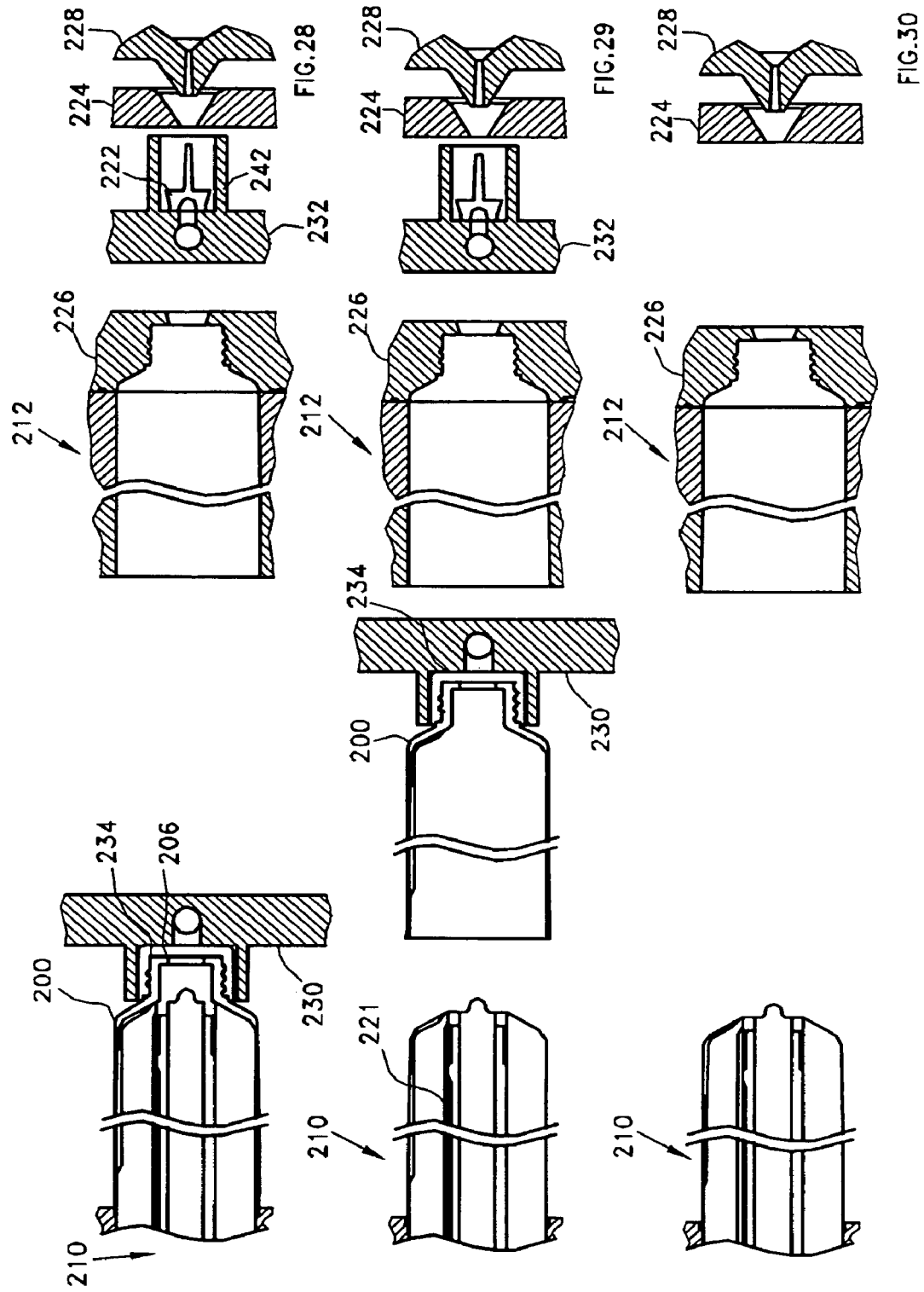

REMOVAL FROM CORE MOLD PART OF TUBULAR INJECTION MOLDED PLASTIC PRODUCT FORMED WITH TWO OPEN ENDS

CROSS-REFERENCE TO RELATED APPLICATION

This is a divisional of co-pending application Ser. No. 10/813,970 filed Mar. 31, 2004, which will issue as U.S. Pat. No. 7,169,342 on Jan. 30, 2007. This application is also related to application Ser. No. 11/140,818, which was filed on May 31, 2005 as a divisional of application Ser. No. 10/813,970 filed Mar. 31, 2004, and which issued as U.S. Pat. No. 7,707,989 on Jul. 18, 2006.

BACKGROUND OF THE INVENTION

The present invention generally pertains to injection molding of plastic products and is particularly directed to removal from a core mold part of a hollow injection molded product having a substantially tubular section that is formed in the mold cavity with two open ends.

One process of manufacturing a hollow plastic product with a substantially tubular section includes the steps of:

(a) providing a cavity mold part with a generally cylindrical portion for forming at least an outside segment of the substantially tubular section of the product;

(b) providing a core mold part with a generally cylindrical portion for forming at least an inside segment of the substantially tubular section of the product;

(c) combining the cavity mold part with the core mold part to configure a mold cavity for forming a product with a substantially tubular section;

(d) injecting plastic material into the mold cavity to form the molded plastic product; and (e) separating the core mold part from the cavity mold part while retaining the molded product on the core mold part; and (f) removing the molded product from the core mold part.

It is difficult to remove a molded product with a substantially tubular section from the core mold part because the injected plastic material shrinks upon cooling within the mold cavity and thereby causes the substantially tubular section of the molded product to adhere tightly to the generally cylindrical portion of the core mold part. Such difficulty is especially severe when the tubular section of the molded product is very thin and flexible.

It is known in the prior art to inject compressed air into an injection-molded hollow plastic product that is formed in the mold cavity with a substantially tubular section, one open end and one closed end in order to loosen the product from the core mold part.

SUMMARY OF THE INVENTION

The present invention provides apparatus for removing an injection-molded hollow plastic product with a substantially tubular section, two open ends and a thread at the outside of one end of the product from a core mold part after the threaded end of the molded product has been opened by removal of a portion of the threaded end of the molded product, the apparatus comprising: means for closing the threaded end of the molded product after the threaded end of the molded product has been opened to the core mold part by removal of the portion of the threaded end of the molded product from the molded product; and means for injecting compressed air into the molded product to loosen the molded product from the core mold part, at least subsequently to said closing of the threaded end of the molded product.

Additional features of the present invention are described with reference to the detailed description of the preferred embodiments. Some of these additional inventive features that are not claimed herein are reserved for divisional patent applications.

BRIEF DESCRIPTION OF THE DRAWING

FIG. 1 is a partial sectional view of a mold in which cavity and core mold parts are combined for configuring a mold cavity in accordance with one preferred embodiment of the present invention, with the mold cavity being shown as configured at the commencement of injection of the plastic material.

FIG. 2 is an end view of the right end of the core mold part shown in FIG. 1.

FIG. 3 is a partial sectional view of the mold of FIG. 1, with the mold cavity being shown as reconfigured for injection of plastic material during an early portion of the injection cycle while the core mold part is being centered within the cavity mold part.

FIG. 4 is a partial sectional view of the mold of FIG. 1, with the mold cavity being shown as configured for further injection of plastic material.

FIG. 5 is a partial sectional view of the mold of FIG. 1, with the mold cavity being shown as reconfigured by retraction of the inner core prior to separation of the core mold part from the cavity mold part after the plastic product has been molded in the mold cavity.

FIG. 6 is a partial view of the core mold part shown in FIG. 1 after the core mold part has been separated from the cavity mold part while retaining the molded product on the core mold part, wherein the inner core is still retracted when compressed air is initially injected to help remove the product from the core mold part.

FIG. 7 is a partial view of the core mold part subsequent to the view shown in FIG. 6 wherein the inner core is protracted to further help remove the molded product from the core mold part and compressed air is further injected to still further help remove the product from the core mold part.

FIG. 8 is a plan view of one preferred embodiment of an injection-molded product manufactured in accordance with the present invention.

FIG. 9 is a partial sectional view of a mold in which cavity and core mold parts are combined for configuring a mold cavity in accordance with another preferred embodiment of the present invention, with the mold cavity being shown as configured prior to commencement of injection of the plastic material.

FIG. 10 is an end view of the right end of the core mold part shown in FIG. 9.

FIG. 11 is a partial sectional view of the mold of FIG. 9, with the mold cavity being shown as reconfigured for injection of plastic material during an early portion of the injection cycle while the core mold part is being centered within the cavity mold part.

FIG. 11A is an enlarged view of the portion of FIG. 11 shown within circle 11A.

FIG. 12 is a partial sectional view of the mold of FIG. 9, with the mold cavity being shown as reconfigured for further injection of plastic material.

FIG. 13 is a partial sectional view of the mold of FIG. 9, with the mold cavity being shown as reconfigured for still further injection of plastic material to form the closed end of the molded product.

FIG. 14 is a partial sectional view of the mold of FIG. 9, with the mold cavity being shown as reconfigured by retraction of the inner core prior to separation of the core mold part from the cavity mold part after the plastic product has been molded in the mold cavity.

FIG. 15 is a partial view of the core mold part shown in FIG. 9 after the core mold part has been separated from the cavity mold part while retaining the molded product on the core mold part, wherein the inner core is still retracted when compressed air is initially injected to help remove the product from the core mold part.

FIG. 16 is a partial view of the core mold part subsequent to the view shown in FIG. 15, wherein the inner core is protracted to further help remove the molded product from the core mold part and compressed air is further injected to still further help remove the product from the core mold part.

FIG. 17 is a partial sectional view of a mold in which cavity and core mold parts are combined for configuring a mold cavity in accordance with still another preferred embodiment of the present invention, with the mold cavity being shown as configured prior to commencement of injection of the plastic material.

FIG. 18 is an end view of the right end of the core mold part shown in FIG. 17.

FIG. 19 is a partial sectional view of the mold of FIG. 17, with the mold cavity being shown as reconfigured for injection of plastic material during an early portion of the injection cycle while the core mold part is being centered within the cavity mold part.

FIG. 20 is a partial sectional view of the mold of FIG. 17, with the mold cavity being shown as reconfigured for further injection of plastic material.

FIGS. 25 to 30 illustrate a process of removing an injection-molded hollow plastic product with a substantially tubular section, two open ends and a thread at the outside of one end of the product from a core mold part in accordance with the other aspect of the present invention.

DETAILED DESCRIPTION

Figure 21:
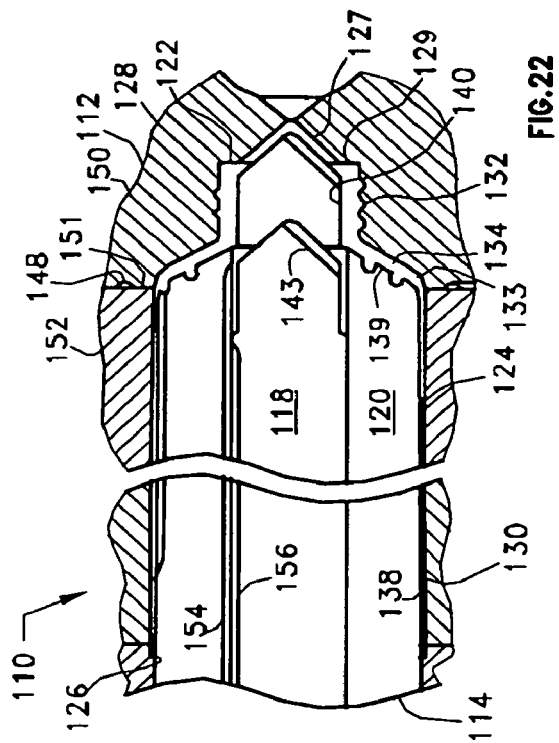
FIG. 21 is a partial sectional view of the mold of FIG. 17, with the mold cavity being shown as reconfigured for still further injection of plastic material to form the closed end of the molded product.

One preferred embodiment of the present invention is described with reference to FIGS. 1 to 7. A mold 10 includes a cavity mold part 12 and a core mold part 14, which are combined for configuring a mold cavity 16. The mold cavity 16 is configured and reconfigured during different stages of the manufacturing process to have different shapes and sizes. The core mold part 14 includes an inner core 18 and an outer core 20. The inner core 18 and the outer core 20 are independently movable with respect to each other and with respect to the cavity mold part 12.

The cavity mold part 12 is combined with the core mold part 14 as shown in FIGS. 3 and 4 to configure and reconfigure the mold cavity 16 for forming a molded product hollow plastic product 22 with a substantially tubular thin-wall section 24, one open end 26, one closed end 27 and a thread 28 at the outside of the closed end 27 of the molded product 22, as shown in FIGS. 5-7. The portion of the mold cavity 16 that forms the open end 26 of the molded product 22 is located between the outer core 20 and a section 31 of the core mold part 14.

The cavity mold part 12 includes a generally cylindrical portion 30 for forming at least an outside segment of the substantially tubular section 24 of the molded product 22, a thread-forming portion 32 for forming the thread 28 on the outside of a neck 29 of the molded product 22, a shoulder-forming portion 33 for forming the outside of a shoulder 34 extending between the substantially tubular section 24 and the neck 29 of the molded product 22 and a conical end portion 36 for forming the outside of the closed end 27 of the molded product 22.

The outer core 20 of the core mold part 14 includes a generally cylindrical portion 38 for forming at least an inside segment of the substantially tubular section 24 of the product 22 and a shoulder-forming portion 39 for forming the outside of the shoulder 34.

The inner core 18 of the core mold part 14 includes a generally cylindrical portion 40 for forming the inside of the neck 29 of the molded product 22 lying inside the thread 28 and a conical end portion 42 for forming the inside of the closed end 27 of the molded product 22. The inner core 18 forms the inside of the neck 29 and the inside of the closed end 27 when the inner core 18 is almost fully protracted, as shown in FIGS. 3 and 4.

The mold cavity 16 also includes a plurality of flow leaders 44 extending radially from a gate 45 and a plurality of flow guides 46. The flow guides 46 are disposed for directing injected plastic material into a thin-wall portion of the mold cavity 16 that forms the substantially tubular thin-wall section 24 of the product 22. In this embodiment, the thin-wall section 24 of the product may be injection molded in the manner described in U.S. Pat. No. 6,599,460, the disclosure of which is incorporated herein by reference thereto.

At the commencement of injection of plastic material from an injection unit (not shown), the inner core 18 and the outer core 20 are fully protracted to configure the mold cavity 16 as shown in FIG. 1 in order to block flow of the plastic material within the mold cavity 16 and thereby compress the injected plastic material within the injection unit and the runner system (not shown) so that injection of the plastic material into the thin-wall section of the mold cavity 16 is faster when such blockage is ended by partially withdrawing the inner core 18.

When the injected plastic material is suitably compressed, the inner core 18 is partially withdrawn to the protracted position shown in FIG. 3 to enable the injected plastic material to flow within the mold cavity 16 to form the closed end 27 and the neck 29 of the molded product 22, and to flow through the flow leaders 44 to the flow guides 46 and thence to the other end of the mold cavity 16 that forms the open end 26 of the molded product 22 to thereby form the substantially tubular section 24 of the molded product 22.

The outer core 20 remains fully protracted in contact with the cavity mold part 12 to thereby stabilize the core mold part 14 with respect to the cavity mold part in order to control the position of the core mold part 14 within the cavity mold part 12 and thereby the thickness of the substantially tubular section 24 of the molded product 22. In this embodiment, the inner core 18 and the outer core 20 may be retracted and protracted by hydraulic means and/or in the manner described in U.S. Pat. No. 4,867,672, the disclosure of which is incorporated herein by reference thereto.

When the substantially tubular section 24 of the molded product 22 has been formed, the outer core 20 is retracted as shown in FIG. 4 to enable the injected plastic material to flow within the mold cavity 16 to form the shoulder 34 and thereupon complete the formation of the molded product 22.

The molded product 22 is then allowed to cool within the mold cavity 16 prior to removing the molded product 22 from the mold 10.

When the molded product 22 has cooled for a suitable duration, the inner core 18 is retracted as shown in FIG. 5 so that when the molded product 22 is removed from the cavity mold part 12, the neck 29 is compressed by the thread 28 to partially occupy the region of the mold cavity 16 vacated upon removal of the inner core 18, whereby the thread 28 may be removed from the cavity mold part 12 without damaging the thread 28.

After the inner core 18 has been retracted, the core mold part 14 is separated from the cavity mold part 12 as shown in FIG. 6 to thereby remove the molded product 22 from the cavity mold part 12 while retaining the molded product 22 on the core mold part 14. In one version, but not all versions, of this embodiment, compressed air is injected between the molded product 22 and the cavity mold part 12 to loosen the molded product 22 from the cavity mold part 12 and thereby help the removal of the molded product 22 from the cavity mold part 12. The compressed air is injected through a channel 48 in one section 50 of the cavity mold part and thence through an air gap 51 of approximately 0.01 mm between two sections 50, 52 of the cavity mold part 12.

Upon the molded product 22 being removed from the cavity mold part 12, a robotically operated product receiver (not shown) is moved into positions between the cavity mold part 12 and the core mold part 14 to receive the molded product 22 when the molded product is removed from the core mold part 14.

Compressed air is injected through the core mold part 14 into the closed end 27 of the molded product 22 to thereby at least help remove the molded product 22 from the core mold part 14.

Referring to FIG. 6, the compressed air is first injected through an outer channel 54 in the outer core 20. Because the end 27 of the molded product 22 is closed and the open end 26 is also closed by reason of being contained within the portion of the mold cavity 16 located between the outer core 20 and the section 31 of the core mold part 14, the initial injection of compressed air into the closed end 27 causes the substantially tubular section 24 to tend to balloon away from the core mold part 14 and thereby at least helps remove the molded product 22 from the core mold part 14.

Referring to FIG. 7, the inner core 18 is then protracted in relation to the outer core 20 to push against the neck 29 and as to increase the pressure within the closed end 27 to further help remove the molded product 22 from the core mold part 14 when such further help is necessary. Upon such protraction of the inner core 18 the inner channel 56 is opened, whereupon the compressed air is injected through the inner channel 56 into the closed end 27 to thereby still further help remove the molded product 22 from the core mold part 14.

After the molded product 22 has been removed from the core mold part 14, at least a portion of the closed end 27 is removed to thereby provide the molded product 22 with a substantially tubular section 24, a neck 29 at one end 27a and two open ends 26, 27a, as shown in FIG. 8.

Another preferred embodiment of the present invention is described with reference to FIGS. 9 to 16. A mold 60 includes a cavity mold part 62 and a core mold part 64, which are combined for configuring a mold cavity 66. The mold cavity 66 is configured and reconfigured during different stages of the manufacturing process to have different shapes and sizes. The core mold part 64 includes an inner core 68 and an outer core 70. The inner core 68 and the outer core 70 are independently movable with respect to each other and with respect to the cavity mold part 62.

The cavity mold part 62 is combined with the core mold part 64 as shown in FIGS. 11 to 13 to configure and reconfigure the mold cavity 66 for forming a molded product hollow plastic product 72 with a substantially tubular thin-wall section 74, one open end 76, one closed end 77 and a thread 78 at the outside of the closed end 77 of the molded product 72, as shown in FIGS. 14-16. The portion of the mold cavity 66 that forms the open end 76 of the molded product 72 is located between the outer core 70 and a section 81 of the core mold part 64.

The cavity mold part 62 includes a generally cylindrical portion 80 for forming at least an outside segment of the substantially tubular section 74 of the molded product 72, a thread-forming portion 82 for forming the thread 78 on the outside of a neck 79 of the molded product 72, a shoulder-forming portion 83 for forming the outside of a shoulder 84 extending between the substantially tubular section 74 and the neck 79 of the molded product 72 and a conical end portion 86 for forming the outside of the closed end 77 of the molded product 72.

The outer core 70 of the core mold part 64 includes a generally cylindrical portion 88 for forming at least an inside segment of the substantially tubular section 74 of the product 72 and a shoulder-forming portion 89 for forming the outside of the shoulder 84.

The inner core 68 of the core mold part 64 includes a generally cylindrical portion 90 for forming the inside of the neck 79 of the molded product 72 lying inside the thread 78 and a conical end portion 92 for forming the inside of the closed end 77 of the molded product 72. The inner core 68 forms the inside of the neck 79 and the inside of the closed end 77 when the inner core 68 is protracted, as shown in FIGS. 11 and 12.

The mold cavity 66 also includes a plurality of flow leaders 93 extending radially from a gate 94, a plurality of circular throttles 95 and a plurality of flow guides 96. The flow guides 96 are disposed for directing injected plastic material into a thin-wall portion of the mold cavity 66 that forms the substantially tubular thin-wall section 74 of the product 72. In this preferred embodiment, the thin-wall section 74 of the product may be injection molded in the manner described in U.S. Pat. No. 6,599,460.

At the commencement of injection of plastic material from an injection unit (not shown), the inner core 68 and the outer core 70 are fully protracted to configure the mold cavity 66 as shown in FIG. 9 in order to block flow of the plastic material within the mold cavity 66 and thereby compress the injected plastic material within the injection unit and the runner system (not shown) so that injection of the plastic material into the thin-wall section of the thin-wall section of the mold cavity 66 is faster when such blockage is ended by partially withdrawing the inner core 68.

When the injected plastic material is suitably compressed, the outer core 70 is partially withdrawn as shown in FIGS. 11 and 11A to enable the injected plastic material to flow through the flow leaders 93 into the neck-forming portion of the mold cavity 66 to form the neck 79 of the molded product 72, thence into the shoulder-forming portion of the mold cavity 66 to begin formation of the shoulder 84 and thence to the flow guides 96, which direct the injected plastic material to the other end of the mold cavity 66 that forms the open end 76 of the molded product 72 to thereby form the substantially tubular section 74 of the molded product 72. The inner core 68 remains fully protracted in contact with the cavity mold part 62. The partial withdrawal of the outer core 70 is to a position 0.2 mm from the fully protracted position shown in FIG. 9. In this embodiment, the inner core 18 and the outer core 20 may be retracted and protracted by hydraulic means and/or in the manner described in U.S. Pat. No. 4,867,672.

The flow of the injected plastic material through the flow leaders 93 to the flow guides 96 is throttled by the throttles 95 to control the position of the core mold part 64 within the cavity mold part 62 in a manner similar to that described in U.S. Pat. No. 4,959,005 with reference to FIGS. 1 and 2 therein and thereby controls the thickness of the substantially tubular section 74 of the molded product 72. The relevant disclosure of U.S. Pat. No. 4,959,005 is incorporated herein by reference thereto.

When the substantially tubular section 74 of the molded product 72 has been formed, the outer core 70 is retracted as shown in FIG. 12 to enable the injected plastic material flowing within the mold cavity 66 to complete formation of the shoulder 84, and the inner core 68 is partially withdrawn to the protracted position shown in FIG. 13 to enable the injected plastic material flowing within the mold cavity 66 to form the closed end 77 of the molded product 72, and thereupon complete the formation of the molded product 72. The retraction of the outer core 70 is to a position 1.0 mm from the fully protracted position shown in FIG. 9.

Although the retraction of the outer core 70 is shown in FIG. 12 as occurring before the partial withdrawal of inner core 68, in alternative versions of this embodiment the retraction of the outer core 70 may occur after or simultaneously with the partial withdrawal of inner core 68.

The molded product 72 is then allowed to cool within the mold cavity 66 prior to removing the molded product 72 from the mold 60.

When the molded product 72 has cooled for a suitable duration, the inner core 68 is retracted as shown in FIG. 13 so that when the molded product 72 is removed from the cavity mold part 62, the neck 79 is compressed by the thread 78 to partially occupy the region of the mold cavity 66 vacated upon removal of the inner core 68, whereby the thread may be removed from the cavity mold part 62 without damaging the thread 78.

After the inner core 68 has been retracted, the core mold part 64 is separated from the cavity mold part 62 as shown in FIG. 14 to thereby remove the molded product 72 from the cavity mold part 62 while retaining the molded product 72 on the core mold part 64. In one version, but not all versions, of this embodiment, compressed air is injected between the molded product 72 and the cavity mold part 62 to loosen the molded product 72 from the cavity mold part 62 and thereby help the removal of the molded product 72 from the cavity mold part 62. The compressed air is injected through a channel 98 in one section 100 of the cavity mold part and thence through an air gap 101 of approximately 0.01 mm between two sections 100, 102 of the cavity mold part 72.

Upon the molded product 72 being removed from the cavity mold part 62, a robotically operated product receiver (not shown) is moved into positions between the cavity mold part 62 and the core mold part 64 to receive the molded product 72 when the molded product is removed from the core mold part 64.

Compressed air is injected through the core mold part 64 into the closed end 77 of the molded product 72 to thereby at least help remove the molded product 72 from the core mold part 64.

Referring to FIG. 15, the compressed air is first injected through an outer channel 104 in the outer core 70. Because the end 77 of the molded product 72 is closed and the open end 76 is also closed by reason of being contained within the portion of the mold cavity 76 located between the outer core 70 and the section 81 of the core mold part 64, the initial injection of compressed air into the closed end 77 causes the substantially tubular section 74 to tend to balloon away from the core mold part 64 and thereby at least helps remove the molded product 72 from the core mold part 64.

Referring to FIG. 16, the inner core 68 is then protracted in relation to the outer core 70 to push against the neck 79 and as to increase the pressure within the closed end 77 to further help remove the molded product 72 from the core mold part 64 when such further help is necessary. Upon such protraction of the inner core 68 the inner channel 106 is opened, whereupon the compressed air is injected through the inner channel 106 into the closed end 77 to thereby still further help remove the molded product 72 from the core mold part 64.

After the molded product 72 has been removed from the core mold part 64, at least a portion of the closed end 77 is removed to thereby provide the molded product with a substantially tubular section, a neck at one end and two open ends, as shown in FIG. 8.

Another preferred embodiment of the present invention is described with reference to FIGS. 17 to 24. A mold 110 includes a cavity mold part 112 and a core mold part 114, which are combined for configuring a mold cavity 116. The mold cavity 116 is configured and reconfigured during different stages of the manufacturing process to have different shapes and sizes.

The core mold part 114 includes an inner core 118 and an outer core 120. The inner core 118 and the outer core 120 are independently movable with respect to each other and with respect to the cavity mold part 112.

The cavity mold part 112 is combined with the core mold part 114 as shown in FIGS. 19 to 21 to configure and reconfigure the mold cavity 116 for forming a molded product hollow plastic product 122 with a substantially tubular thin-wall section 124, one open end 126, one closed end 127 and a thread 128 at the outside of the closed end 127 of the molded product 122, as shown in FIGS. 20-24. The portion of the mold cavity 116 that forms the open end 126 of the molded product 122 is located between the outer core 120 and a section 131 of the core mold part 114.

The cavity mold part 112 includes a generally cylindrical portion 130 for forming at least an outside segment of the substantially tubular section 124 of the molded product 122, a thread-forming portion 132 for forming the thread 128 on the outside of a neck 129 of the molded product 122, a shoulder-forming portion 133 for forming the outside of a shoulder 134 extending between the substantially tubular section 124 and the neck 129 of the molded product 122 and a conical end portion 136 for forming the outside of the closed end 127 of the molded product 122.

The outer core 120 of the core mold part 114 includes a generally cylindrical portion 138 for forming at least an inside segment of the substantially tubular section 124 of the product 122 and a shoulder-forming portion 139 for forming the outside of the shoulder 134.

The inner core 118 of the core mold part 114 includes a generally cylindrical portion 140 for forming the inside of the neck 129 of the molded product 122 lying inside the thread 128 and a conical end portion 142 for forming the inside of the closed end 127 of the molded product 122. The inner core 118 forms the inside of the neck 129 and the inside of the closed end 127 when the inner core 118 is protracted, as shown in FIGS. 19 and 20.

The mold cavity 116 also includes a plurality of flow leaders 143 extending radially from a gate 144, a plurality of spiral flow leaders 145 and a plurality of flow guides 146. The flow guides 146 are disposed for directing injected plastic material into a thin-wall portion of the mold cavity 116 that forms the substantially tubular thin-wall section 124 of the product 122. In this preferred embodiment, the thin-wall section 124 of the product may be injection molded in the manner described in U.S. Pat. No. 6,599,460.

At the commencement of injection of plastic material from an injection unit (not shown), the inner core 118 and the outer core 120 are fully protracted to configure the mold cavity 116 as shown in FIG. 17 in order to block flow of the plastic material within the mold cavity 116 and thereby compress the injected plastic material within the injection unit and the runner system (not shown) so that injection of the plastic material into the thin-wall section of the mold cavity 116 is faster when such blockage is ended by partially withdrawing the inner core 118.

When the injected plastic material is suitably compressed, the outer core 120 is partially withdrawn as shown in FIG. 19 to enable the injected plastic material to flow through the radial flow leaders 143 into the neck-forming portion of the mold cavity 116 to form the neck 129 of the molded product 122, thence through the spiral flow leaders 145 into the shoulder-forming portion of the mold cavity 116 to begin formation of the shoulder 134 and thence to the flow guides 146, which direct the injected plastic material to the other end of the mold cavity 116 that forms the open end 126 of the molded product 122 to thereby form the substantially tubular section 124 of the molded product 122. The inner core 118 remains fully protracted in contact with the cavity mold part 112. The partial withdrawal of the outer core 120 is to a position 0.2 mm from the fully protracted position shown in FIG. 17. In this embodiment, the inner core 18 and the outer core 20 may be retracted and protracted by hydraulic means and/or in the manner described in U.S. Pat. No. 4,867,672.

The flow of the injected plastic material through the radial flow leaders 143 to the flow guides 146 controls the position of the core mold part 114 within the cavity mold part 112 in a manner similar to that described in U.S. Pat. No. 4,959,005 with reference to FIGS. 5 and 6 therein to thereby control the thickness of the substantially tubular section 124 of the molded product 122. The relevant disclosure of U.S. Pat. No. 4,959,005 is incorporated herein by reference thereto.

When the substantially tubular section 124 of the molded product 122 has been formed, the outer core 120 is retracted as shown in FIG. 20 to enable the injected plastic material flowing within the mold cavity 116 to complete formation of the shoulder 134, and the inner core 118 is partially withdrawn to the protracted position shown in FIG. 21 to enable the injected plastic material flowing within the mold cavity 116 to form the closed end 127 of the molded product 122, and thereupon complete the formation of the molded product 122. The retraction of the outer core 120 is to a position 1.0 mm from the fully protracted position shown in FIG. 17.

Although the retraction of the outer core 120 is shown in FIG. 20 as occurring before the partial withdrawal of inner core 118, in alternative versions of this embodiment the retraction of the outer core 120 may occur after or simultaneously with the partial withdrawal of inner core 118.

The molded product 122 is then allowed to cool within the mold cavity 116 prior to removing the molded product 122 from the mold 110.

When the molded product 122 has cooled for a suitable duration, the inner core 118 is retracted as shown in FIG. 21 so that when the molded product 122 is removed from the cavity mold part 112, the neck 129 is compressed by the thread 128 to partially occupy the region of the mold cavity 116 vacated upon removal of the inner core 118, whereby the thread 128 may be removed from the cavity mold part 112 without damaging the thread 128.

Figure 22:
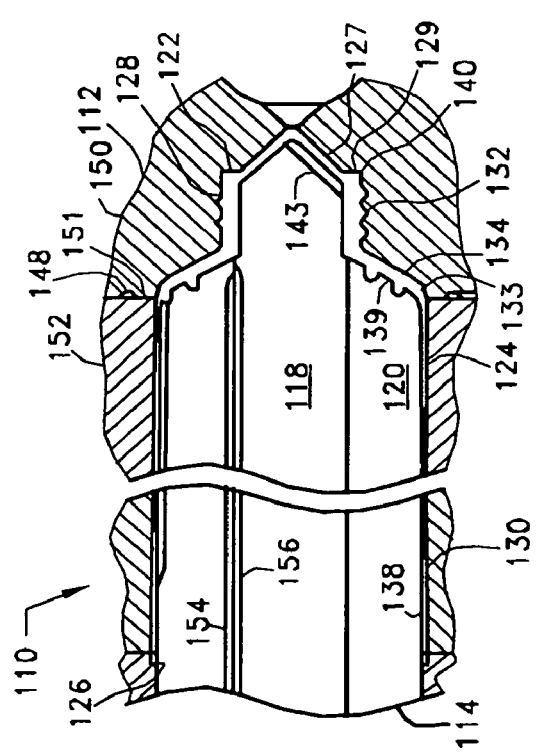
FIG. 22 is a partial sectional view of the mold of FIG. 17, with the mold cavity being shown as reconfigured by retraction of the inner core prior to separation of the core mold part from the cavity mold part after the plastic product has been molded in the mold cavity.

After the inner core 118 has been retracted, the core mold part 114 is separated from the cavity mold part 112 as shown in FIG. 22 to thereby remove the molded product 122 from the cavity mold part 112 while retaining the molded product 122 on the core mold part 114. In one version, but not all versions, of this embodiment, compressed air is injected between the molded product 122 and the cavity mold part 112 to loosen the molded product 122 from the cavity mold part 112 and thereby help the removal of the molded product 122 from the cavity mold part 112. The compressed air is injected through a channel 148 in one section 150 of the cavity mold part and thence through an air gap 101 of approximately 0.01 mm between two sections 150, 152 of the cavity mold part 122.

Upon the molded product 122 being removed from the cavity mold part 112, a robotically operated product receiver (not shown) is moved into positions between the cavity mold part 112 and the core mold part 114 to receive the molded product 122 when the molded product is removed from the core mold part 114.

Compressed air is injected through the core mold part 114 into the closed end 127 of the molded product 122 to thereby at least help remove the molded product 122 from the core mold part 114.

Figure 23:
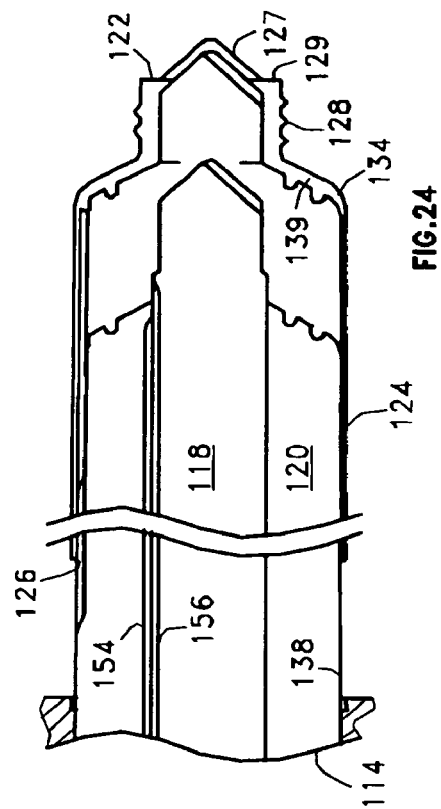
FIG. 23 is a partial view of the core mold part shown in FIG. 17 after the core mold part has been separated from the cavity mold part while retaining the molded product on the core mold part, wherein the inner core is still retracted when compressed air is initially injected to help remove the product from the core mold part.

Referring to FIG. 23, the compressed air is first injected through an outer channel 154 in the outer core 120. Because the end 127 of the molded product 122 is closed and the open end 126 is also closed by reason of being contained within the portion of the mold cavity 116 located between the outer core 120 and the section 131 of the core mold part 114, the initial injection of compressed air into the closed end 127 causes the substantially tubular section 124 to tend to balloon away from the core mold part 114 and thereby at least helps remove the molded product 122 from the core mold part 114.

Figure 24:
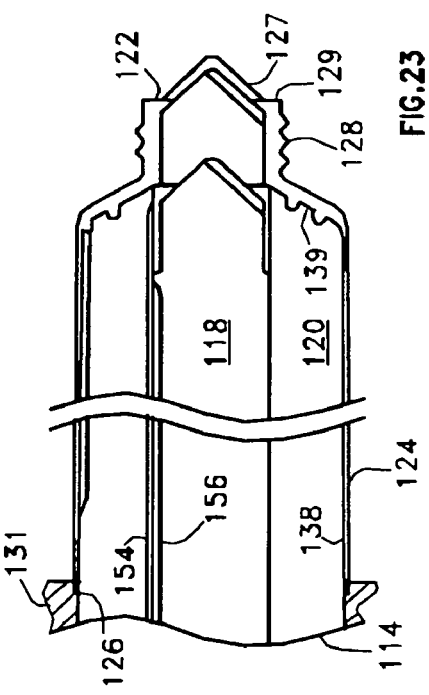
FIG. 24 is a partial view of the core mold part subsequent to the view shown in FIG. 23 wherein the inner core is protracted to further help remove the molded product from the core mold part and compressed air is further injected to still further help remove the product from the core mold part.

Referring to FIG. 24, the inner core 118 is then protracted in relation to the outer core 120 to push against the neck 129 and as to increase the pressure within the closed end 127 to further help remove the molded product 122 from the core mold part 114 when such further help is necessary. Upon such protraction of the inner core 118 the inner channel 156 is opened, whereupon the compressed air is injected through the inner channel 156 into the closed end 127 to thereby still further help remove the molded product 122 from the core mold part 114.

After the molded product 122 has been removed from the core mold part 114, at least a portion of the closed end 127 is removed to thereby provide the molded product with a substantially tubular section, a neck at one end and two open ends, as shown in FIG. 8.

The preferred plastic material used for injection molding the product is polypropylene. Alternatively other plastic materials may be so used.

In alternative embodiments, (a) the mold cavity is not blocked in order to compress the injected plastic material within the injection unit and the runner system prior to injecting the plastic material into the thin-wall section of the mold cavity, as described with reference to FIGS. 1, 9 and 17, (b) the inner core is not protracted during removal of the molded product from the core mold part, as shown in FIGS. 7, 16 and 24 and/or (c) the molded product may have many different shapes other than the shape illustrated herein.

A preferred embodiment of a process of removing an injection-molded hollow plastic product 200 with a substantially tubular section 202, two open ends 204, 206 and a thread 208 at the outside of one end 206 of the product 200 from a core mold part 210 is described with reference to FIGS. 25-30. The product 200 may be molded in a manner similar to the molding of the products in the embodiments described above with reference to FIGS. 1-24, with some modifications.

The mold includes a core mold part 210 and a cavity mold part 212, which are combined to configure and reconfigure a mold cavity in which the product 200 is formed. The core mold part 210 includes an outer core 214 and an inner core 216, as in the above-described embodiments. However, the core mold part 216 is modified to include a center core 218 within a sleeve 220. The outer core 214, the center core 218 and the sleeve 220 are movable with respect to one another and with respect to the cavity mold part 212. The core mold part also includes inner and/or outer channels 221 through which compressed air can be injected to help remove the molded product 200 from the core mold part 210.

Although the product 200 is shown as having been molded with a closed end member 222 having a different shape than the conical closed end of the molded product in the above-described embodiments, in an alternative embodiment, the closed end member 222 of the product 200 may be conical or still some other shape. The molded product 200 may have many different shapes other than the shape illustrated herein.

The cavity mold part 212 is modified to include an ejector plate 224 that is separable from a cavity plate 226 located at the end of the mold cavity part 212 that forms the outside of the threaded end 206 of the product 200. The ejector plate 224 is combined with a runner plate 228.

The configuration of the mold upon the completion of the molding cycle is illustrated in FIG. 25.

Referring to FIG. 26, the center core 218 is protracted while the ejector plate 224 and the runner plate 228 are separated from the cavity plate 226 to remove the closed end member 222 from the molded product 200 to thereby provide the molded product 200 with two open ends 204, 206. The removed closed end member 222 is momentarily retained by the ejector plate 224.

After the core mold part 210 has been separated from the cavity mold part 212 to separate the molded product 200 from the cavity mold part 212 while retaining the molded product on the core mold part 210, as shown in FIG. 27, a first robotic arm 230 is moved into a position between the molded product 200 and the cavity mold part 212 and a second robotic arm 232 is moved into a position between the ejector plate 224 and the cavity plate 226. Preferably the first robotic arm 230 and the second 232 are coupled to a common robotic component (not shown), are operated robotically, and are moved simultaneously into their respective positions.

The first robotic arm 230 includes a holder 233 for retaining a closure 234 having a thread 236 matching the thread 208 at the threaded end 206 of the product. Preferably the closure 234 is threaded plastic cap for the product 200. The first robotic arm 230 also includes a port 240 for connection to a compressed air source (not shown).

The second robotic arm 232 includes a chamber 242 for receiving the removed closed end member 222 from the ejector plate 224 and a port 244 for connection to a suction device (not shown).

Referring to FIG. 28, the first robotic arm 230 is moved toward the molded product 200 retained on the core mold part 210 in order to squeeze the closure 234 onto the thread 208 of the molded product 200 and thereby closes the threaded end 206 of the molded product 200. At approximately the same time, the removed closed end member 222 together with a cold sprue attached thereto are removed from the ejector plate 224 and the runner plate 228 by suction and are received in the chamber 242.

Referring to FIG. 29, compressed air is injected through the channels 221 into the molded product 200 in the manner described above with reference to FIGS. 6, 15 and 23 to loosen the molded product 200 from the core mold part 210 and the first robotic arm 230 is moved away from the core mold part 210 to remove the molded product 200 from the core mold part 210.

Referring to FIG. 30, the first robotic arm 230 is withdrawn from the position between the core mold part 210 and the cavity mold part 212 and the second robotic arm 232 is moved from the position between the ejector plate 224 and the cavity plate 226. The first robotic arm 230 thereby transfers the molded product 200 with the closure 234 attached thereto from the position between the core mold part 210 and the cavity mold part 212. The closure 234 may be retained on the product 200 while the product is filled with some substance and until after the open end 204 of the product 200 is closed.

In one preferred embodiment the closure is a plastic cap that is injection molded in the injection molding system in which the product 200 is injection molded. The plastic caps are injection molded at the same average rate as the products 200 are injection molded. In one injection molding cycle a first robotic arm 230 acquires a plastic cap 234 in the holder 233; and in the next injection molding cycle the first robotic arm pushes the closure 234 onto the threaded end 206 of a product 200.

In an alternative embodiment, the first robotic arm 230 includes a closure that includes a thread, such as the thread 236, but which can be opened to the port 240. In this embodiment, the closure is pushed onto the thread 208 at the threaded end 206 of the product 200 by moving the first robotic arm 230 toward the molded product 200 retained on the core mold part 214, as described with reference to FIG. 28, to thereby close the threaded end 206 of the product 200. When compressed air is injected into the product 200 through the channels 221, as described with reference to FIG. 29, compressed air also is injected into the product 200 through the port 240 in the first robotic arm 230 to help loosen the molded product 200 from the core mold part 210; and the first robotic arm 230 is moved away from the core mold part 210 to remove the molded product 200 from the core mold part 210.

The processes and apparatus described herein can be used advantageously with the injection-molding and other processes and apparatus described in U.S. Pat. Nos. 5,879,613; 5,858,286; 5,262,112; 5,149,482; 5,008,064; 5,174,941 and 4,846,483 and U.S. patent application Ser. No. 10/715,618, filed Nov. 18, 2003.

The documents that are incorporated herein by reference thereto do not necessarily use the same terminology as used herein.

The benefits specifically stated herein do not necessarily apply to every conceivable embodiment of the present invention. Further, such stated benefits of the present invention are only examples and should not be construed as the only benefits of the present invention.

While the above disclosure contains many specificities that may or may not be common to all of the embodiments described herein, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the process claims, except for those steps that can only occur in the sequence in which they are recited, and except for those steps for which the occurrence of a given sequence is specifically recited or must be inferred, the steps of the process claims do not have to occur in the sequence in which they are recited.

The invention claimed is:

1. Apparatus for removing an injection-molded hollow plastic product with a substantially tubular section, two open ends and a thread at the outside of one end of the product from a core mold part after the threaded end of the molded product has been opened by removal of a portion of the threaded end of the molded product, the apparatus comprising;

means for closing the threaded end of the molded product after the threaded end of the molded product has been opened to the core mold part by removal of the portion of the threaded end of the molded product from the molded product; and means for injecting compressed air into the molded product to loosen the molded product from the core mold part, at least subsequently to said closing of the threaded end of the molded product.

2. Apparatus according to claim 1, wherein the means for closing the threaded end of the molded product comprises means for attaching a threaded closure having a matching thread onto the threaded end of the product.

3. Apparatus according to claim 2, wherein the attaching means comprises means for robotically using a robotic arm to attach the threaded closure onto the threaded end of the product.

4. Apparatus according to claim 3, wherein the attaching means comprises the robotic arm and the robotic arm includes the threaded closure.

5. Apparatus according to claim 2, wherein the threaded closure is a plastic cap.

6. Apparatus according to claim 5, further comprising:
   means for injection molding the plastic cap in the injection molding system in which the product is injection molded.

7. Apparatus according to claim 6, wherein the means for injection molding the plastic cap are adapted for injection molding plastic caps at the same average rate as the products are injection molded.

* * * * *